United States Patent
Rondeux et al.

(10) Patent No.: US 10,215,533 B2
(45) Date of Patent: Feb. 26, 2019

(54) SYSTEM FOR GUIDING MISSILES FOR VEHICLES AND MOVING TARGETS

(71) Applicant: CMI Defence S.A., Loncin (BE)

(72) Inventors: Christian Rondeux, Liège (BE); Pierre Balthasart, Sprimont (BE)

(73) Assignee: CMI DEFENCE S.A., Loncin (BE)

( * ) Notice: Subject to any disclaimer, the term of this patent is extended or adjusted under 35 U.S.C. 154(b) by 0 days.

(21) Appl. No.: 15/317,991

(22) PCT Filed: May 13, 2015

(86) PCT No.: PCT/EP2015/060711
§ 371 (c)(1),
(2) Date: Dec. 12, 2016

(87) PCT Pub. No.: WO2015/189003
PCT Pub. Date: Dec. 17, 2015

(65) Prior Publication Data
US 2017/0138699 A1    May 18, 2017

(30) Foreign Application Priority Data

Jun. 13, 2014   (BE) .................................. 2014/0450

(51) Int. Cl.
*F41G 7/26*     (2006.01)
*G01S 3/786*    (2006.01)
*H04N 5/232*    (2006.01)

(52) U.S. Cl.
CPC ............ *F41G 7/263* (2013.01); *G01S 3/7864* (2013.01); *H04N 5/2328* (2013.01)

(58) Field of Classification Search
CPC .. F41A 27/28; F41A 27/30; F41G 1/00; F41G 3/00; F41G 3/005; F41G 3/02; F41G 3/06; F41G 3/12; F41G 3/14; F41G 3/16
See application file for complete search history.

(56) References Cited

U.S. PATENT DOCUMENTS

| | | | |
|---|---|---|---|
| 2,440,968 A * | 5/1948 | Colbath | F41G 5/00 235/404 |
| 3,489,057 A | 1/1970 | Tonkin | |
| 3,954,340 A * | 5/1976 | Blomqvist | G01S 3/783 356/139.08 |
| 4,096,380 A * | 6/1978 | Eichweber | F41G 7/008 244/3.13 |

(Continued)

FOREIGN PATENT DOCUMENTS

| | | |
|---|---|---|
| DE | 4137843 A1 | 5/1993 |
| DE | 4203474 A | 8/1993 |
| FR | 2004425 A1 | 11/1969 |

*Primary Examiner* — Thien M Le
*Assistant Examiner* — Asifa Habib
(74) *Attorney, Agent, or Firm* — Leydig, Voit & Mayer, Ltd.

(57) ABSTRACT

An armored vehicle has a turret having a gun; a targeting system which is arranged inside the turret and is provided with a day channel, a night or thermal channel and a laser range-finder, a power control system for controlling the movement of the turret in azimuth and the movement of the gun in elevation; a device for guiding missiles using lasers, which generates a laser guiding line; and a turret controller which determines the mode for guiding the missile, wherein the turret has gyrostabilizer for gyrostabilizing the laser-guiding line.

7 Claims, 1 Drawing Sheet

→ Digital servo data
┄┄► Digital control data

(56) References Cited

U.S. PATENT DOCUMENTS

| | | | | |
|---|---|---|---|---|
| 4,662,727 A | * | 5/1987 | Griffin | G02B 27/644 |
| | | | | 356/139.05 |
| 5,056,736 A | * | 10/1991 | Barton | F41G 7/26 |
| | | | | 244/3.13 |
| 5,197,691 A | | 3/1993 | Amon et al. | |
| 8,457,498 B2 | * | 6/2013 | Stewart | G01S 3/786 |
| | | | | 398/108 |
| 8,833,232 B1 | * | 9/2014 | Fox | F41A 27/18 |
| | | | | 89/41.06 |
| 2014/0138473 A1 | * | 5/2014 | Yu | F41G 7/263 |
| | | | | 244/3.16 |

\* cited by examiner

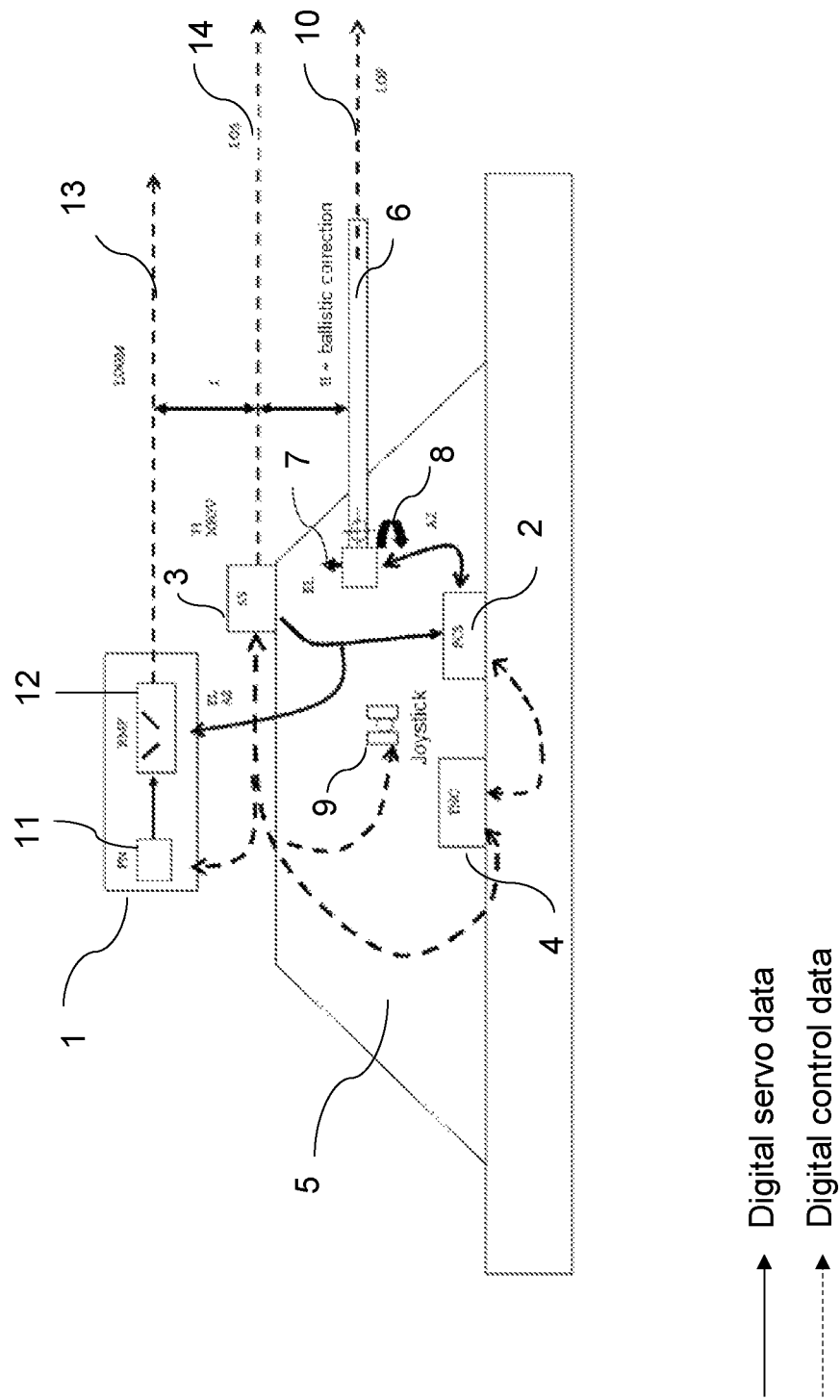

SYSTEM FOR GUIDING MISSILES FOR VEHICLES AND MOVING TARGETS

CROSS-REFERENCE TO RELATED APPLICATIONS

This application is a U.S. national stage application under 35 U.S.C. § 371 of International Application No. PCT/EP2015/060711, filed on May 13, 2015, and claims benefit to Belgian Patent Application No. 2014/0450, filed on Jun. 13, 2014. The International Application was published in French on Dec. 17, 2015, as WO 2015/189003 A1 under PCT Article 21(2).

FIELD

The present invention relates to the technical field of missile guidance systems within moving units and/or tanks and with moving targets.

BACKGROUND

One knows laser guidance systems for missiles of the "beamrider" type, in which a laser signal receiver located in the rear part of the missile detects the laser signal, analyzes it and determines the position of the missile. The latter centers itself automatically relative to the beam. Two alternated patterns ensure coding of the horizontal and vertical position of the missile.

This guidance system is deemed to be very precise in static mode. However, when the missile is launched, for example from an armored vehicle turret under actual operating conditions, i.e. when the vehicle or the target is moving, and particularly on uneven land or when there is wind, the precision of the guidance is deteriorated.

Furthermore, it is known that currently, an armored vehicle turret typically comprises a sight system, which provides the gunner and the commander with a day channel and a night (or thermal) channel, as well as a laser telemeter. The gunner and the commander have both at their disposal a station with a joystick, which makes it possible to give the azimuth and elevation (or height or altitude) command to the sight system, and therefore to modify the line of sight, as well as a control screen. The commander's sight system also provides a panoramic view. The image in the sight system is gyrostabilized relative to the ground owing to an integrated gyroscopic system. This means that the line of sight remains parallel to itself irrespective of the movements of the vehicle. The line of sight and the line of fire are parallel to each other owing to the power control system which commands the turret in azimuth and the cannon in elevation, according to the values communicated by the sight system.

The guidance system, comprising a laser line and a control camera that are perfectly harmonized, i.e. aligned or optically matched, is fastened to the launcher or to the vehicle, and may or may not be integrated into the sight system of the vehicle, or on a station separated from the vehicle. According to the state of the art, the means for modifying the direction of the laser guidance line are rudimentary and do not allow precise, fluid and regular control to engage a moving target. Currently, any modification in the guidance line is done manually, without assistance from the optic, either by moving the turret, or by moving the guidance system of the missile. This causes somewhat mediocre performance and also does not offer many firing opportunities.

Document DE 42 03 474 A discloses a sight device for a gunner of an armored vehicle, in which the gunner observes the target by means of a day/night periscope installed in the turret, the optical axis of which is harmonized with the axis of an integrated laser telemeter, operating according to the pulse return principle. In order to optimize the firing range and precision, there is provision for having, in the functional field of the laser telemeter, a guidance laser transmitter as a separate entity, in the guidance beam of which flies a projectile provided with a receiver in its rear part and the optical axis of which is generated so as to be harmonized with the optical axis of the day/night periscope. The guidance laser transmitter is positioned in the turret of the tank in the region between the day/night periscope and the reactive modules of the armored vehicle located behind the sight station. A device of this type was on the Leopard II tank.

In document DE 41 37 843 A1, the weapon system includes a sight module equipped with an integrated laser telemeter. A laser beam is modulated outside the sight module and coupled to the optical path of the laser telemeter via a fold mirror, to serve as a guidance beam for a remotely guided projectile.

The inventoried missile firing stability and precision limits, in the case of the solutions of the state of the art, are related, depending on the case, to:
- the movement inside the vehicle (occupants, motor, wind, etc.);
- scenarios involving firing at a moving target;
- the moving vehicle; in this case, the use of the optical system may be contemplated, but is not really recommended because many conditions would have to be met (flat terrain, etc.).

SUMMARY in an embodiment, the present invention provides an armored vehicle comprising: a turret including a cannon; a sight system installed in the turret, the sight system including a day channel; a night or thermal channel, and a laser telemeter; the sight system further including a power control system configured to command movement of the turret in azimuth and movement of the cannon in elevation; a laser missile guidance device, configured to generate a laser guidance line; and a turret network controller configured to determine a missile guidance, wherein the sight system further includes a sight line gyrostabilizer configured to provide a line of sight which is gyrostabilized relative to an inertial frame of reference, wherein the sight system further includes a laser line gyrostabilizer configured to gyrostabilize the laser guidance line by servo-control of the laser guidance line with respect to the gyrostabilized line of sight; such that the laser guidance line is continuously parallel to the line of sight; wherein the laser missile guidance device includes a laser line modifier configured to modify the laser guidance line, by a motorized platform servo-controlled along at least two axes, in elevation and in azimuth, and wherein the sight line gyrostabilizer and the laser line modifier are separate.

BRIEF DESCRIPTION OF THE FIGURES

The present invention will be described in even greater detail below based on the exemplary FIGURE. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawing which illustrates the following:

FIG. 1 diagrammatically shows a missile guidance system with improved precision according to the present invention.

DETAILED DESCRIPTION

An aspect of the present invention provides a solution in which the laser guidance line is perfectly stabilized in the cases in which the launcher is located on a moving vehicle, subject to wind or vibrations, optionally on uneven land or when the target moves.

A first aspect of the invention relates to an armored vehicle comprising a turret with a cannon, a sight system installed in the turret and provided with a day channel, a night or thermal channel and a laser telemeter, a power control system to command the movement of the turret in azimuth and that of the cannon in elevation, a laser missile guidance device generating a laser guidance line and a turret network controller determining the guidance mode of the missile, the sight system being gyrostabilized relative to an inertial frame of reference, the turret comprising means for gyrostabilizing the laser guidance line that are means for servo-controlling the laser guidance line with respect to a line of sight provided by the gyrostabilized sight system, so that the laser guidance line is continuously parallel to the line of sight, characterized in that the laser missile guidance device is mechanically independent from the sight system and comprises a motorized platform servo-controlled along two axes, in elevation and in azimuth.

According to preferred embodiments of the invention, the armored vehicle comprises at least one, or a suitable combination, of the following features:
- the servo-controlled motorized platform comprises a system of mirrors with two axes, respectively in elevation and in azimuth, or a gimbal system;
- the vehicle comprises means for selecting the laser guidance either in LOS or ALOS mode;
- said means comprise the communication of offset parameters for the elevation and the azimuth by the turret network controller to the motorization device of the turret and of the cannon as well as to the laser missile guidance, the values of the offset parameters being different in LOS and ALOS mode;
- the laser missile guidance device is servo-controlled with respect to the position signal of the line of sight relative to the inertial frame of reference, via two feedback loops in elevation and in azimuth, respectively.

A second aspect of the invention relates to a missile firing method using the armored vehicle as described above, characterized by the following steps:
- a gunner or a commander determines the sight parameters to engage a target with the day channel or the night channel of the gyrostabilized sight system or with the camera of the laser guidance system and assigns the desired guidance mode of the missile, LOS or ALOS;
- the elevation value for the cannon and the azimuth value for the turret are provided to the power control system;
- the power control system positions the turret and the cannon in the firing position;
- the turret network controller indicates the guidance mode, LOS or ALOS, to the laser missile guidance device;
- the guidance laser is oriented by servo-control with respect to the sight parameters, the laser guidance line being then parallel to the line of sight;
- the gunner or the commander fires the missile and the latter is guided by the guidance laser.

A third aspect of the present invention relates to the use of the laser missile guidance device associated with the armored vehicle as described above, in a situation involving firing at a moving target, controlled driving of the armored vehicle, vibrations or strong wind.

An idea behind the invention is to take advantage of the precision of the optical sight system to servo-control the guidance line of the missile and thereby obtain the same precision for the guidance as for the optical sight. The system according to the invention is diagrammatically shown in FIG. 1.

It is desired, in particular when the vehicle is in motion, to take advantage of the provision of an inertial frame of reference, in this case it is desired to servo-control the laser guidance line 13 with respect to that inertial frame of reference, for example via a servo-controlled motorized platform 12. The gyroscopic system used may then be that typically associated with the sight system 3, or may be integrated into said platform 12.

However, the inventors have adopted, as preferred solution, an embodiment in which the sight system 3 is completely independent from the guidance system 1, inasmuch as that solution makes it in particular possible to remain independent from the optic supplier. Thus, the guidance system 1 will be able to benefit from the precision of the information provided by the stabilized optical sight system, but without having to be integrated therein, and it will therefore be possible to add or replace it at a later time without modification of the existing sight system, for example when the guidance system 1 is upgraded.

According to this embodiment of the invention, the guidance laser 11 is stabilized by servo-controlling the means for modifying the guidance line with respect to the gyrostabilized sight system 3. These means for modifying the guidance line are for example a fixed platform 12 with two mirrors moving in azimuth and in elevation, respectively. The advantage of this system is lower inertia and high reactivity. The means for modifying the guidance line may also, for example, be a moving platform 12 of the gimbal type, motorized along two axes, in azimuth and elevation, respectively. Thus, the laser guidance line 13 remains constantly parallel to the line of sight 14 and is always pointed toward the target, irrespective of the movements of the turret 5 or of the body of the armored vehicle.

The power control system 2 (PCS) commands the turret 5 in azimuth 8 and the cannon 6 in elevation 7. The sight parameters provided by the gunner or the commander to the gyrostabilized sight system 3 make it possible to change the line of sight 14 by commanding a mirror. A camera then transmits the modified line of sight onto the control screen of the gunner/the commander. These parameters are also provided to the PCS 2 as elevation 7 value of the cannon 6 and azimuth 8 value of the turret 5. At this level, there is advantageously a control loop from an elevation angle sensor of the cannon 6. The ballistic corrections are injected into the feedback loop of the elevation of the cannon.

According to the invention, the absolute position signal of the sight mirror relative to the turret is duplicated and injected into the control system of the mirrors of the guidance laser (or alternatively of the motorized platform 12 of the gimbal type). The absolute position of the sight mirror relative to the turret is then sent to the mirrors of the laser. The result is therefore a servo-control of the mirrors of the guidance laser (or of the motorized platform of the guidance laser) in the terrestrial (inertial) frame of reference via the absolute position of the sight mirror relative to the turret, the turret serving as an intermediate reference relative to the inertial frame of reference. Ultimately, the laser guidance line 13 remains automatically and continuously parallel to the line of sight 14.

For example, the gunner engages his target with the thermal channel in an ultra-narrow field of view or the day channel in a narrow field of view and determines the desired guidance mode:
"above line of sight" or ALOS mode;
"line of sight" or LOS mode.

Concretely, in ALOS mode, the missile flies above the line of sight 14, and in LOS mode, the missile flies on the line of sight 14. The elevation angle 7 of the power control system 2 will therefore not be the same in LOS mode and ALOS mode owing to different offset systems in ALOS and LOS modes, in a fully transparent manner for the operator. This makes it possible to not light the target with the guidance laser beam 13, which may be detected by some targets (e.g., tanks). The turret network controller (TNC) 4 notifies the PCS 2 that it must enter a specific mode.

The remotely motorized platform 12 (RMP) does not recognize whether ALOS or LOS mode is active, since it is servo-controlled with respect to the sight system 3 regardless of the mode used. In both modes, the day or night sight is always pointed toward the target.

According to the invention, the trajectory of the missile is corrected automatically. The laser responds to specific commands. The turret system commands the laser so that it operates according to the current guidance phase and allows the line of sight to remain very stable. The RMP positions its mirror(s) so that the laser is positioned in the sight direction.

The originality of the invention in one preferred embodiment therefore lies in having the ability to engage a target with one of the effective cameras of the sight system, i.e. the day camera (B/W or color), or the night (thermal) camera, and/or with the B/W camera of the laser guidance.

The advantages of the invention are:
fineness and precision of laser pointing far better than the systems of the prior art: better stabilization and more precise adjustment, better probability on moving target;
complete mechanical independence relative to the sight system: it is therefore possible to choose any sight system compatible with the specifications of the turret;
greater flexibility than having everything offered and integrated into a sight system designed to receive the guidance, which would also be more cumbersome;
in controlled environments, possibility of firing in "driving" mode.

The drawback of the invention is, however, having to integrate an additional system into the turret (guidance platform control system).

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B, and C" should be interpreted as one or more of a group of elements consisting of A, B, and C, and should not be interpreted as requiring at least one of each of the listed elements A, B, and C, regardless of whether A, B, and C are related as categories or otherwise. Moreover, the recitation of "A, B, and/or C" or "at least one of A, B, or C" should be interpreted as including any singular entity from the listed elements, e.g., A, any subset from the listed elements, e.g., A and B, or the entire list of elements A, B, and C.

LIST OF REFERENCE SYMBOLS

1 missile guidance unit
2 power control system
3 gyrostabilized sight system
4 turret network controller
5 turret
6 cannon
7 elevation angle
8 azimuth angle
9 gunner (or commander) joystick
10 line of fire
11 guidance laser
12 servo-controlled motorized platform (with or without mirrors)
13 LOS or ALOS guidance line
14 line of sight

The invention claimed is:

1. An armored vehicle comprising:
a turret including a cannon;
a sight system installed in the turret, the sight system including a day channel, a night or thermal channel, and a laser telemeter, the sight system further including a sight line gyrostabilizer configured to provide a line of sight which is gyrostabilized relative to an inertial frame of reference;
a power control system configured to command movement of the turret in azimuth and movement of the cannon in elevation;
a laser missile guidance device configured to generate a laser guidance line, the laser missile guidance device including a laser line gyrostabilizer configured to gyrostabilize the laser guidance line with respect to the gyrostabilized line of sight provided by the sight line gyrostabilizer such that the laser guidance line is continuously parallel to the gyrostabilized line of sight, the laser line gyrostabilizer comprising a servo-controlled motorized platform rotatable about at least two axes, in elevation and in azimuth; and
a turret network controller configured to determine a missile guidance mode,
wherein the laser missile guidance device is mechanically independent from the sight system.

2. The armored vehicle of claim 1, wherein the motorized platform comprises a system of mirrors, or a gimbal system.

3. The armored vehicle of claim 1, further comprising:
a selector configured to switch the missile guidance mode between a line of sight ("LOS") mode and an above line of sight ("ALOS") mode.

4. The armored vehicle of claim 3, wherein the selector is further configured to communicate one or more offset parameters for the elevation and the azimuth using the turret network controller to a motorization device of the turret, the cannon, and the laser missile guidance device,
  wherein values of the offset parameters are different in LOS mode and ALOS mode.

5. The armored vehicle of claim 1, wherein the laser missile guidance device is servo-controlled with respect a position signal of the gyrostabilized line of sight relative to the inertial reference frame, via at least two feedback loops, in elevation and azimuth, respectively.

6. A missile firing method using the armored vehicle of claim 2, the method comprising:
  determining sight parameters to engage a target with the day channel or the night channel of the sight system or with a camera of the laser missile guidance device;
  assigning a desired missile guidance mode of the missile;
  providing an elevation value for the cannon and an azimuth value for the turret to the power control system;
  positioning, using the power control system, the turret and the cannon in a firing position;
  indicating, using the turret network controller, the desired missile guidance mode to the laser missile guidance device;
  orienting, using the servo-controlled motorized platform with respect to the sight parameters, the laser guidance line so that the laser guidance line is then parallel to the gyrostabilized line of sight; and
  firing the missile, which is guided using the laser guidance line.

7. The use of the laser missile guidance device associated with the armored vehicle of claim 1, in a situation involving firing at a moving target, controlled driving of the armored vehicle, vibrations, or strong wind.

* * * * *